Jan. 4, 1938. P. B. NIBECKER ET AL 2,104,050
OIL AND WATER SEPARATOR
Filed Jan. 8, 1936 4 Sheets-Sheet 1
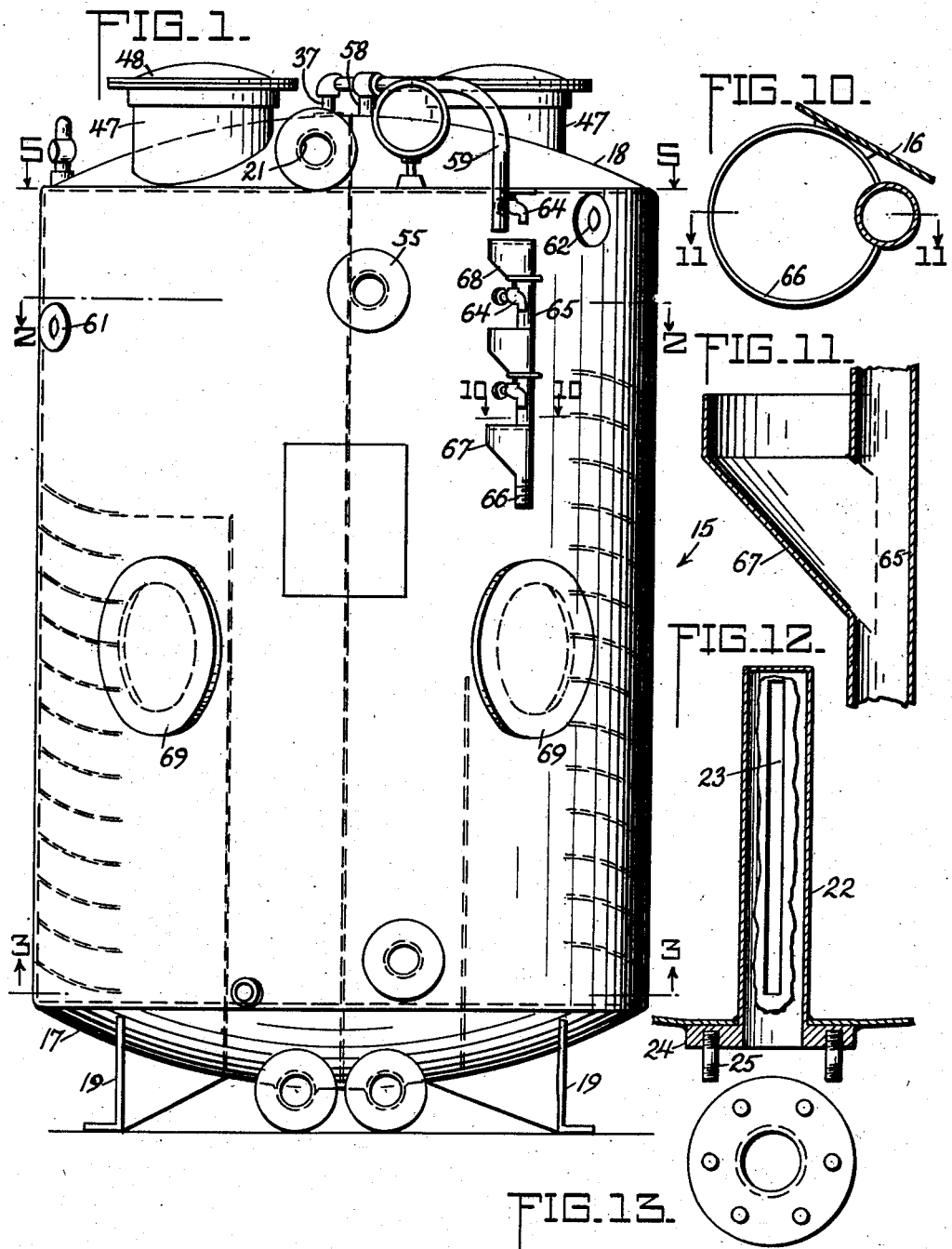
INVENTORS
PAUL B. NIBECKER & ROB ROY MCDONELL
BY
Robert A. Lavender
ATTORNEY Jan. 4, 1938. P. B. NIBECKER ET AL 2,104,050
OIL AND WATER SEPARATOR
Filed Jan. 8, 1936 4 Sheets-Sheet 2

INVENTORS
PAUL B. NIBECKER & ROB ROY McDONELL.
BY
Robert A. Lavender
ATTORNEY

Jan. 4, 1938.  P. B. NIBECKER ET AL  2,104,050
OIL AND WATER SEPARATOR
Filed Jan. 8, 1936  4 Sheets-Sheet 3
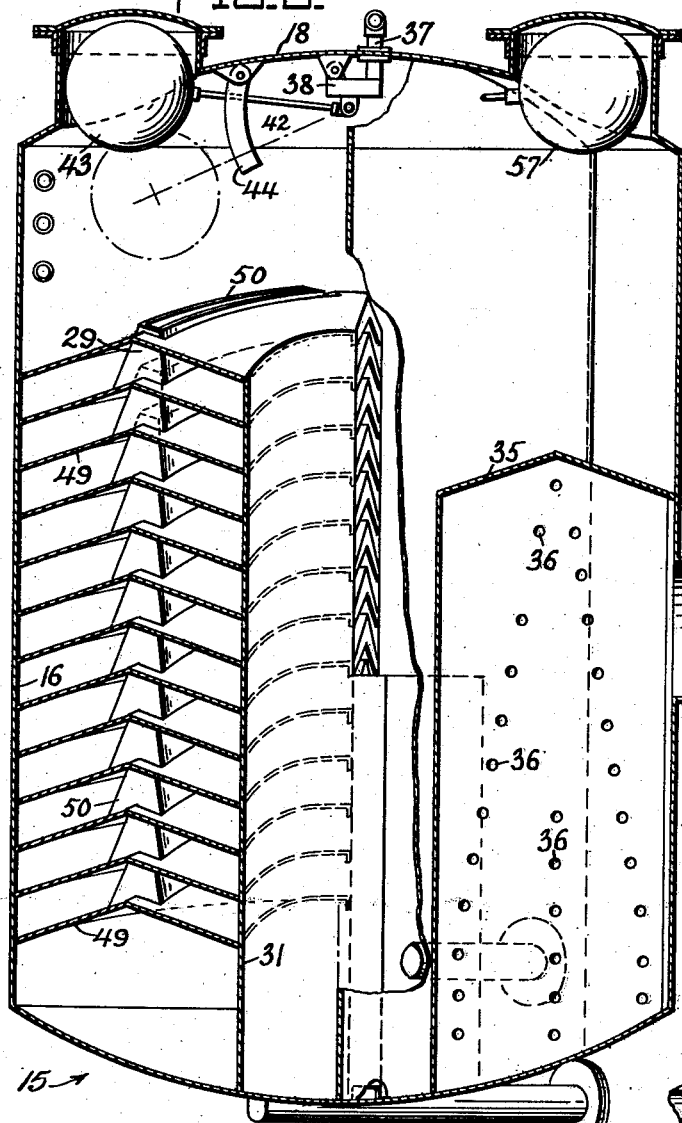
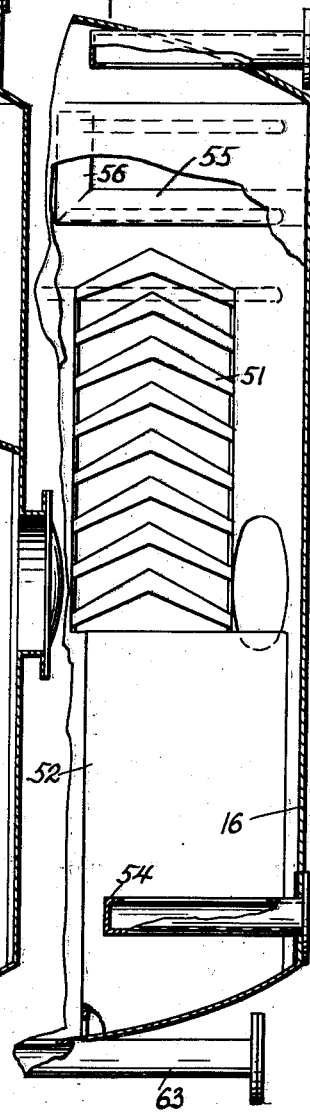
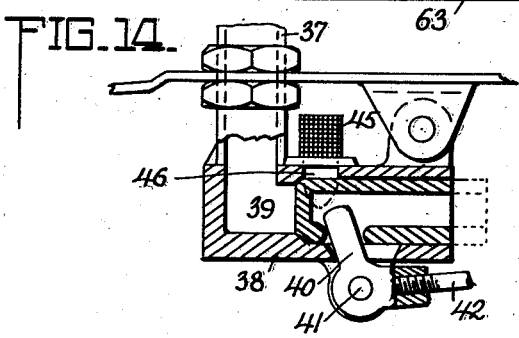
INVENTORS
PAUL B. NIBECKER & ROB ROY MCDONELL
BY
ATTORNEY Jan. 4, 1938.    P. B. NIBECKER ET AL    2,104,050
OIL AND WATER SEPARATOR
Filed Jan. 8, 1936    4 Sheets-Sheet 4

INVENTORS
PAUL B. NIBECKER &
ROB ROY McDONELL.
BY
Robert A. Lavender
ATTORNEY

Patented Jan. 4, 1938

2,104,050

UNITED STATES PATENT OFFICE 2,104,050

OIL AND WATER SEPARATOR

Paul E. Nibecker, United States Navy, and Rob Roy McDonell, Oakland, Calif.

Application January 8, 1936, Serial No. 58,050

12 Claims. (Cl. 210—51)

(Granted under the act of March 3, 1883, as amended April 30, 1928; 370 O. G. 757)

This invention relates to an oil and water separator and has as an object to provide an improved oil and water separator especially intended for installation aboard ship for the purpose of purifying bilge water so that the water may be eliminated and be pumped overboard while the oil or other impurities are retained for reclamation.

It is extremely undesirable, especially on ships of war, to discharge the bilge water overboard because the oil and other impurities will float and thus leave a visible trail betraying the course and presence of the ships of war to enemy craft. Harbor pollution laws prevent the discharge of bilge water near the coast line so long as it contains any perceptible amount of impurities. Before the passage of these laws, the fishing industry was being ruined close to shore and the water became contaminated, preventing its use for any purpose. Nevertheless, it is desirable in the case of vessels to dispose of the bilge water while at shore, if possible, so as to lighten the ship and thus enable a greater amount of cargo and fuel to be carried. This invention makes it possible to dispose of a large percentage of the bilge water in the form of clear water at a minimum expense in that it separates oil and other impurities from the water and enables the water to be discharged overboard without danger of polluting the harbor where the vessel may be located. The oil and water separator of this invention will so clarify the bilge water that it will be contaminated not exceeding 100th of 1 per cent when it has passed therethrough, even though there may be as high as 3 percent of oil and other impurities in the bilge water when it enters the separator of this invention.

A further feature of this invention is that the water will be automatically clarified as it passes therethrough and may be discharged therefrom free from impurities, which impurities will be separately collected and then discharged from the separator. The separator is of the flow type, that is, the impure water will flow into the separator unit, pass therethrough and discharge therefrom in a continuous flow. The liquid impurities such as oil are discharged in a continuous flow from a different discharge point and any solid impurities will collect at the bottom thereof and may be removed therefrom from time to time. In order to operate the separator it is only necessary that the impure water be pumped into the unit at one end and it will flow through and discharge without necessity of utilizing any additional power.

The separator unit of this invention may be operated even though the vessel containing the same may heel over as much as 10 degrees, and it may be made in various capacities. An important feature is that it will occupy a minimum amount of space and permit a maximum amount of flow of the liquid. Heating means may be provided for facilitating the flow especially when the bilge water is apt to contain oils having a high viscosity.

With these and other objects in view, as well as other advantages which may be incident to the use of the improvements, the invention consists of the parts and combinations thereof as hereinafter set forth and claimed. It will be understood that the several necessary elements constituting the same may be varied in proportion and arrangement without departing from the nature and scope of the invention as defined in the appended claims.

In order to make the invention understood, there are shown in the accompanying drawings, means for carrying the invention into practical effect, without limiting the improvements in their useful application to the patent construction, which, for purpose of explanation, have been made the subject of illustration.

In the accompanying drawings:

Fig. 1 is a front elevational view of the oil and water separator unit constituting this invention;

Fig. 6 is a sectional view on line 6—6 of Fig. 2;

Fig. 9 is a partly broken away sectional view on line 9—9 of Fig. 2;

Fig. 10 is a sectional view of the drain on line 10—10 of Fig. 1;

Fig. 11 is a sectional view on line 11—11 of Fig. 10;

Fig. 12 is a sectional view of one of the pipe connections;

Fig. 13 is an end view of Fig. 12; and

Fig. 14 is a partly sectional view of one of the air escape valves.

Figure 3:
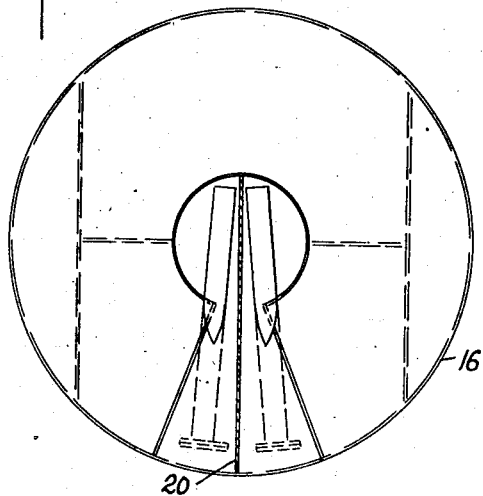
Fig. 3 is a sectional view taken substantially at line 3—3 of Fig. 1, showing the bottom of the separator unit.
Figure 4:
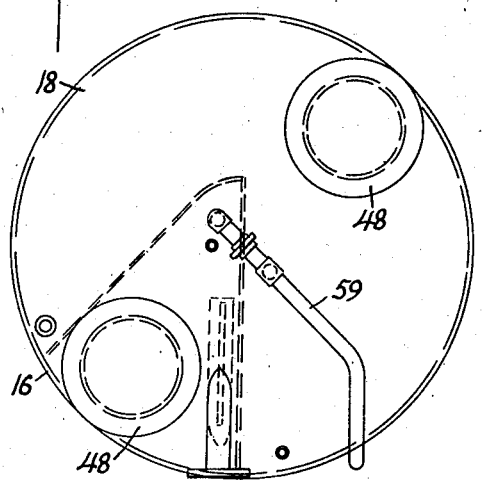
Fig. 4 is a plan view of the top of the separator unit.
Figure 2:
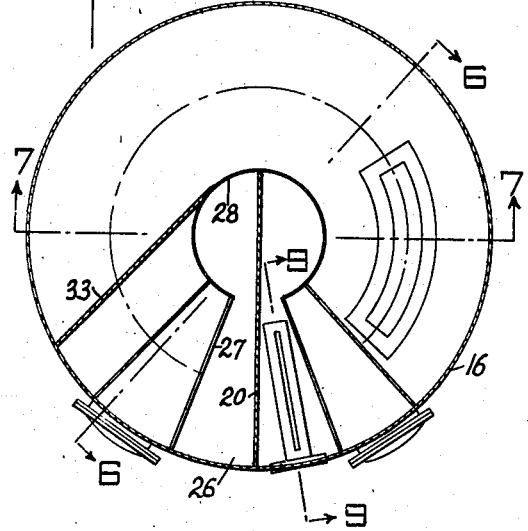
Fig. 2 is a sectional view of the separator unit taken approximately at line 2—2 of Fig. 1.
Figure 5:
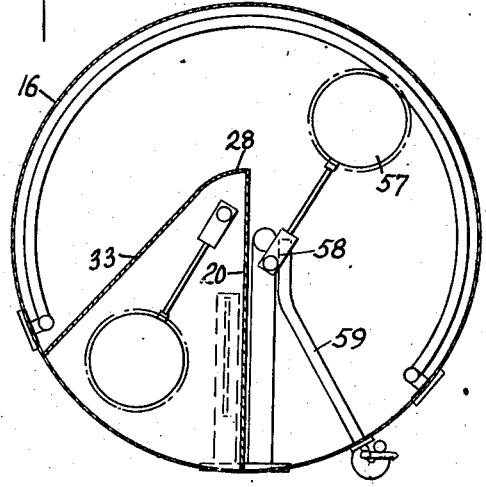
Fig. 5 is a sectional view on line 5—5 of Fig. 1.
Figure 7:
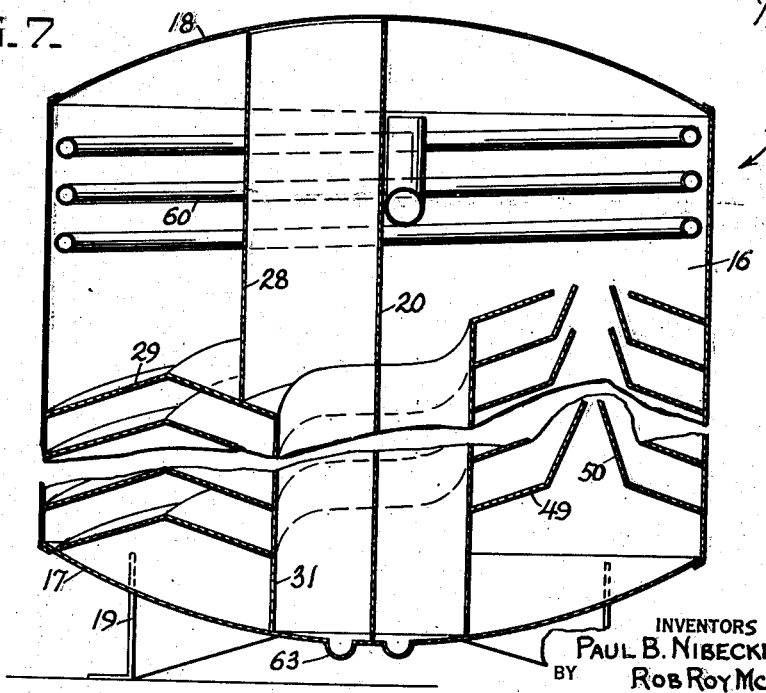
Fig. 7 is a section on line 7—7 of Fig. 2 partly broken away.

There is shown at 15 the separator unit of this invention which includes a cylindrical shell 16 having a bottom plate 17 and a top plate 18. Both bottom and top plates 17 and 18, as will be observed in Figs. 1, 6 and 7, are dome-shaped as shown. The bottom plate 17 rests on legs 19 for supporting the entire unit in any suitable location as desired. The cylindrical wall 16 is provided with a division wall 20 whch, as shown in Figs. 2 and 7, extends from the cylindrical wall 16 at one side to slightly beyond the midpoint thereof and likewise extends from the bottom plate 17 to the top plate 18. This wall 20 thus divides the entrance compartment from the exit compartment, which entrance and exit compartments are connected by the separator compartments.

Extending through the domed top plate 18 is an entrance pipe 21, which includes a pipe connection as shown in Figs. 12 and 13 and consists of a pipe section 22 having a longitudinal slot 23 extending thereon. One end of pipe section 22 is suitably formed into a flange 24 adapted to be welded to the plate and is divided with studs 25 for receiving the flange of any suitable conduit leading from the source of supply of the mixed oil and water. The mixed oil and water from the pipe 21 is discharged through the slot therein into the entrance compartment 26, which is formed on one side by division wall 20 and downwardly extending division plate 27.

This division plate 27 meets a partly cylindrical division plate 28, thereby completing the compartment 26. Division plate 28 extends downwardly to the crowned roof plate 29 of a separator compartment 30. The inner side of the separator compartment 30 is formed by an inner cylindrical plate 31 which joins with a baffle plate 32 extending from the edge of the roof plate 29. Another division plate 33 extends from the division plate 28 and thus serves to divide off the entrance compartment 26 from the oil collection compartment 34.

As the mixed oil and water enter through the entrance pipe 21, its turbulence is decreased upon entering the entrance compartment 26 as it travels downwardly between the division plates 28, 33 and division wall 20 until it reaches the baffle plate 35 which is provided with a series of perforations 36 as shown. As will be observed, the perforations 36 increase in number as they approach the bottom of the unit.

As the mixed oil and water flow into this entrance compartment 26 and descend, they tend to give up some of the air and volatile matter that may be present. This air and gas collect in the top of compartment 26, which is air-tight. Extending through the top plate 18 is a vent nipple 37 to which is secured a valve body 38. A valve plunger 39 is seatable within the valve body 38 by means of a bell crank 40 pivoted as at 41. The other end of the bell crank 40 has a float rod 42 secured thereto which terminates in a hollow float 43. The float rod 42 is provided with a float guide 44 secured to the inner side of the top plate 18. A wire-mesh strainer 45 is secured over an aperture 46 leading to the inside of the valve body 38 and thus to the vent nipple 37. Extending through the top plate 18 is an access pipe 47 to which is removably secured, as by means of bolts, clamps, and other suitable means, an access plate 48.

As the air accumulates in the top of the compartment 26, the oil and water level will drop until the float will drop and move the plunger 39 from the valve seat, allowing the air accumulated in the top of the entrance compartment to vent itself through the strainer 45 and aperture 46 to the vent nipple 37. As the air escapes, the float will rise causing the bell crank 40 to return the plunger valve 39 to closed position.

Figure 8:
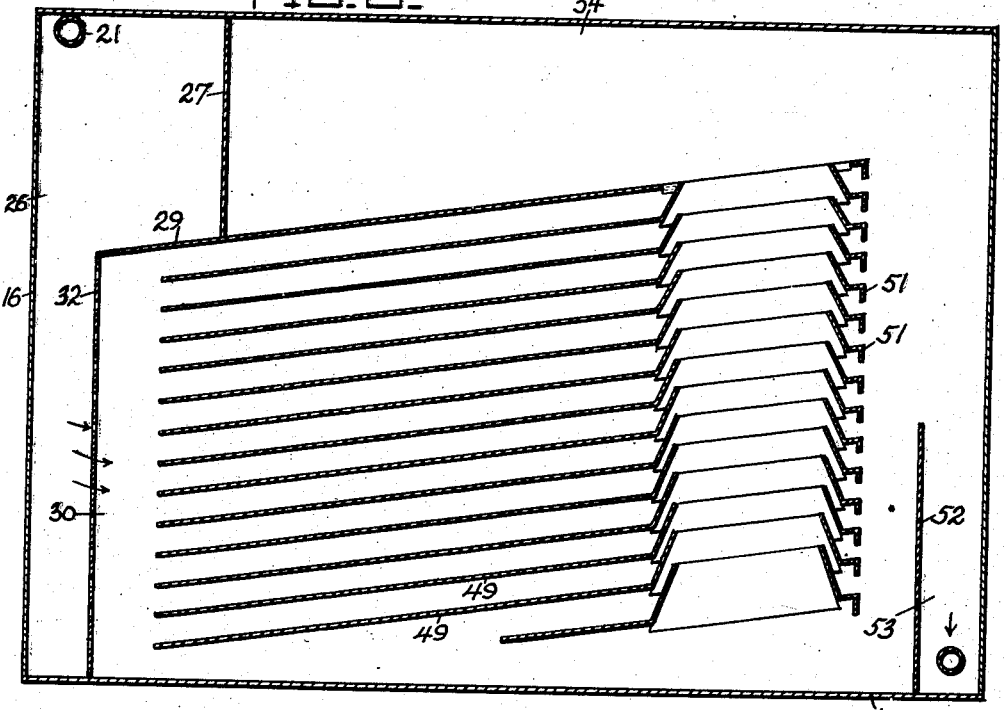
Fig. 8 is an expanded diagrammatic view of the entrance and separator compartments of the unit.

The separator compartment 30 contains a quantity of crowned separator plates 49 leading from adjacent the perforated baffle plate 32 to the end of the separator compartment. These crowned separator plates 49 are inclined somewhat upwardly from adjacent the baffle plate 32 to their exit ends and each crowned plate 49 is provided with an upwardly extending funnel 50. Each funnel 50 extends along the apex of the crown of the plate adjacent its upper end, the end of each crowned separator plate 49 having a downwardly extending flange 51. As will be observed from Figs. 6, 7 and 8, each funnel 50 extends upwardly above the level of the separator plate next thereabove. As the oil and water pass through the perforated baffle plate 36, it is divided into a plurality of strata by the separating plates 49. As the strata of oil and water move through the passageways formed by these separating plates, the water being heavier will naturally gravitate toward the bottom of the passage formed by the division plates while the oil will collect under the apex of the crown of the separator plates which apex it will be observed leads directly to the mid-line of the funnel. As the oil reaches the funnels 50 it will flow upwardly through the funnels into the oil collection compartment 34. The water will travel through the funnels until it strikes downwardly deflecting flanges 51 at the ends of the plates.

An imperforate baffle plate 52 extending upwardly a distance from the bottom plate 17 forms a water exit compartment 53. Extending through the cylindrical shell 16 is a water exit pipe 54 which is identical in construction with the entrance pipe shown in detail in Fig. 12. An oil discharge pipe 55 extends into the oil compartment 34 through the shell 16, the end of the pipe 55 being provided with an upper turning section 56 so as to discharge the oil accumulated above the pipe 56.

As will be apparent, not all the air contained in the mixed oil and water will escape in the entrance compartment 26; some of it will escape into the oil compartment 34 at the same time as the oil is separated from the water. In order to eliminate this air as it accumulates, a float 57 and valve 58, identical in construction with the float and valve assembly in the entrance compartment 36, are connected by a vent nipple 58 to a vent pipe 59, the vent pipe 59 also connecting to vent nipple 37.

The shell 16 may be provided with a plurality of steam pipes 60 into which steam may enter at 61 and escape at 62 so that heat may be supplied as necessary to reduce the viscosity of the oil in the entrance and oil compartments and cause it to flow more freely.

The bottom plate 17 is provided with sludge clean-out pipes 63 at the lowermost points of the entrance compartment 26 and separator compartment 34 so that any sludge dropping to the bottom of the compartments may be removed from them as necessary.

In order to determine the level of the oil and of the water in the unit a plurality of try cocks are provided extending into the oil compartment 34 as at 64. The uppermost try cock 64 has a drain pipe 65, the lower end 66 of which may be secured to any suitable pipe for disposing of any liquid drained through the try cocks. Each of the lower try cocks is provided with a funnel 67 leading into the drain pipe 65 while the top-most funnel 68 is located below the end of the vent pipe 59 so as to catch any liquid that may accidentally be carried through the vent pipe 59. By opening the different try cocks, the relative level of the oil and water may not only be ascertained but also may be changed as desired by allowing the try cocks to remain open until a desired level has been reached.

In addition to the access pipe 47 provided through the top plate 18 access openings 69 are provided through shell 16 leading to the entrance and separator compartments and pipes for steam or cleaning vapors or fluids may be occasionally connected through these access openings to scour and clean the inside of the unit.

As a summary of the operation of my invention, the mixed oil and water enter through pipe 21 to the entrance compartment 26, where the velocity of flow and the turbulence of the entering liquid decreases, allowing some of the entrained air to escape to the top of the compartments where the flow valve permits its escape through the vent pipe 59 from time to time. The mixed liquid then passes through the baffle plate to the separating compartments and is divided into strata by the separating plates. The oil rises through the funnel 50 to the oil compartments 34 and then out through the unit to the oil discharge pipe 55. The water is deflected over the baffle plate 52 to the clear water compartment 53 and through the clear water discharge pipe 54 to a suitable pipe leading over the side of the vessel. Proper manipulation of the try cocks will prevent a too great accumulation of the oil in the oil compartment should it fail to discharge sufficiently fast through the oil discharge pipe 55.

While the preferred form of this invention has been shown and set forth, it will be understood that this invention is not limited to the particular detailed structure hereinbefore disclosed but that modifications and changes may be made within the scope of what is hereinafter disclosed.

The invention described herein may be manufactured and used by or for the Government of the United States of America for governmental purposes without the payment of any royalties thereon or therefor.

Having thus set forth the disclosed invention, what is claimed is:

1. An oil and water separator unit comprising an oil and water entrance compartment, a separator compartment, means in the separator compartment for separating the oil and water into a plurality of spirally ascending, parallel strata permitting the clear water to collect by gravity at the bottom of each strata, the length of the strata being substantially greater than the maximum width of the separator unit but less than the outer periphery thereof, means at the upper end of the separator compartment for deflecting the oil upwardly and the clear water downwardly.

2. An oil and water separator unit comprising an oil and water entrance compartment, a separator compartment, means in the separator compartment for separating the oil and water into a plurality of spirally ascending, parallel strata permitting the clear water to collect by gravity at the bottom of each strata, the length of the strata being substantially greater than the maximum width of the separator unit but less than the outer periphery thereof, means at the upper end of the separator compartment for deflecting the oil upwardly and the clear water downwardly, said strata separating means comprising a plurality of parallel crowned spirally inclined separator plates.

3. An oil and water separator unit comprising an oil and water entrance compartment, a separator compartment, means in the separator compartment for separating the oil and water into a plurality of spirally ascending, parallel strata permitting the clear water to collect by gravity at the bottom of each strata, the length of the strata being substantially greater than the maximum width of the separator unit, means at the upper end of the separator compartment for deflecting the oil upwardly and the clear water downwardly, said strata separating means comprising a plurality of parallel crowned spirally inclined separator plates, said oil deflecting means comprising a plurality of inverted funnels adjacent the upper end of each separating plate, each lower funnel extending upwardly into the opening in the funnel immediately above.

4. An oil and water separator unit comprising an oil and water entrance compartment, a separator compartment, means in the separator compartment for separating the oil and water into a plurality of spirally ascending, parallel strata permitting the clear water to collect by gravity at the bottom of each strata and the oil to float at the top of each strata, the length of the strata being substantially greater than the maximum width of the separator unit, means at the upper end of the separator compartment for deflecting the oil upwardly and the clear water downwardly, said strata separating means comprising a plurality of parallel crowned spirally inclined separator plates, said water deflecting means comprising a downturned flange formed at the upper end of each separating plate.

5. An oil and water separator unit comprising an oil and water entrance compartment, a separator compartment, means in the separator compartment for separating the oil and water into a plurality of spirally ascending, parallel strata permitting the clear water to collect by gravity at the bottom of each strata, the length of the strata being substantially greater than the maximum width of the separator unit, means at the upper end of the separator compartment for deflecting the oil upwardly and the clear water downwardly, said strata separating means comprising a plurality of parallel crowned spirally inclined separator plates, said oil deflecting means comprising an inverted funnel in each separating plate adjacent the upper end thereof, each lower funnel extending upwardly into the opening in the funnel immediately above, said water deflecting means comprising a down-turning flange formed at the upper end of each separating plate.

6. An oil and water separator unit comprising an oil and water entrance compartment, a separator compartment, means in the separator compartment for separating the oil and water into a plurality of spirally ascending parallel strata permitting the clear water to collect by gravity at the bottom of each strata while the oil floats at the top, the length of the strata being substantially greater than the maximum width of the separator unit, means at the upper end of the separator compartment for deflecting the oil upwardly and the clear water downwardly, an oil collecting compartment above said separator compartment, a clear water receiving compartment at the lower end of said separator compartment and a vertical baffle plate between said clear water compartment and said separator compartment.

7. An oil and water separator unit comprising an oil and water entrance compartment, a separator compartment, means in the separator compartment for separating the oil and water into a plurality of spirally ascending, parallel strata permitting the clear water to collect by gravity at the bottom of each strata, the length of the strata being substantially greater than the maximum width of the separator unit, means at the upper end of the separator compartment for deflecting the oil upwardly and the clear water downwardly, an oil collecting compartment above said separator compartment, a clear water receiving compartment at the lower end of said separator compartment and a vertical baffle plate between said clear water compartment and said separator compartment, an entrance pipe for conducting the oil and water into said entrance compartment and an exit pipe conducting the clear water from said clear water compartment each said pipe including a horizontal cylindrical pipe section extending into said compartment and closed off at its end, said pipe section having longitudinal slots within said compartment to diminish turbulence.

8. In an oil and water separator, a separator compartment and an oil and water separator means in said compartment comprising a plurality of parallel, spirally ascending crowned plates whose length is substantially greater than the maximum width of the separator but less than the outer periphery thereof for dividing the oil and water into a plurality of strata, a funnel extending upwardly from each of said crowned plates, each said funnel extending along the crown line of each plate and each lower funnel extending at least part way into the opening of the upper funnel.

9. In an oil and water separator, a separator compartment and an oil and water separator means in said compartment comprising a plurality of parallel, spirally ascending crowned plates whose length is substantially greater than the maximum width of the separator for dividing the oil and water into a plurality of strata, a funnel extending upwardly from each of said crowned plates, each said funnel extending along the crown line of each plate and each lower funnel extending at least part way into the opening of the upper funnel, and a downwardly extending flange formed on the end of each crowned plate.

10. An oil and water separator comprising a cylindrical shell, division plates dividing said shell into an entrance compartment and a separator compartment, a longitudinal slotted pipe extending into said entrance compartment for diminishing the turbulence of the incoming oil and water mixture, the division plate between the entrance compartment and the separator compartment being perforated and strata forming means in said separator compartment, said strata forming means comprising a plurality of parallel, spirally inclined crowned plates extending circumferentially within the cylindrical shell a distance greater than the diameter of the shell.

11. An oil and water separator comprising a cylindrical shell, division plates dividing said shell into an entrance compartment and a separator compartment, at least one of the division plates between the entrance compartment and the separator compartment being perforated and parallel, spirally ascending strata forming means in said separator compartment providing a path substantially longer than the maximum diameter of the shell but less than the circumference thereof.

12. An oil and water separator comprising a cylindrical shell, division plates dividing said shell into an entrance compartment and a separator compartment, at least one of the division plates between the entrance compartment and the separator compartment being perforated and parallel, spirally ascending strata forming means in said separator compartment providing a path substantially longer than the maximum diameter of the shell but less than the circumference thereof, said strata forming means comprising a plurality of upwardly inclined crowned plates extending circumferentially within the circular shell.

PAUL B. NIBECKER.
ROB ROY McDONELL.